Figure 1:
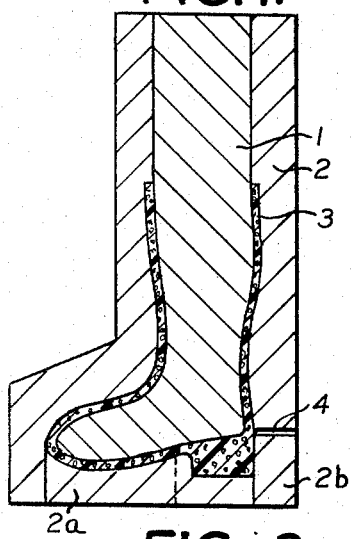

United States Patent [19]
Brehm et al.

[11] 3,823,493
[45] July 16, 1974

[54] FOAM POLYURETHANE BOOT WITH LINING

[75] Inventors: Michael Brehm, Weinheim; Peter Rutsch, Unterabtsteinach, both of Germany

[73] Assignee: Carl Freudenberg, Weinheim, Germany

[22] Filed: Oct. 29, 1971

[21] Appl. No.: 193,673

Related U.S. Application Data

[63] Continuation-in-part of Ser. No. 832,386, June 11, 1969, abandoned.

[52] U.S. Cl. .............................................. 36/2.5 R
[51] Int. Cl. .............................................. A43b
[58] Field of Search ............ 36/2.5 AL, 4, 7.1, 7.3, 36/2.5 R

[56] References Cited
UNITED STATES PATENTS

| | | | |
|---|---|---|---|
| 2,486,953 | 11/1949 | Keene | 36/4 |
| 3,308,560 | 3/1967 | Jones | 36/4 |
| 3,377,721 | 4/1968 | Johnson | 36/2.5 AL |
| 3,691,658 | 9/1972 | DiPerno et al. | 36/4 |

*Primary Examiner*—Patrick D. Lawson
*Attorney, Agent, or Firm*—Burgess, Dinklage & Sprung

[57] ABSTRACT

Improvement in the formation of footwear, particularly boots, by molding polyurethane foam in the annular space between a last and a boot outer mold. In a preferred aspect, there is provided a fabric on the inside wall of the foam, molded boot. In a most preferred aspect, the fabric is bonded to a plastic film of, for example, polyvinyl chloride, and the film bonded fabric is placed over the last in a mold whereupon polyurethane foam precursor is foamed in the mold and adhered to the film thereby adhering indirectly to the fabric while not penetrating such fabric interstices. In another aspect of this invention, reinforcing means, of steel or reinforced plastic, is molded right into the boot during formation thereon.

7 Claims, 10 Drawing Figures

PATENTED JUL 16 1974    3,823,493

FOAM POLYURETHANE BOOT WITH LINING

This application is a continuation in part of application Ser. No. 832,386 filed June 11, 1969, now abandoned.

This invention relates to boots molded of polyurethane foam. It more particularly refers to such boots having a fabric on the inside surface thereof.

It is in the prior art to manufacture polyvinyl chloride boots by the injection molding process. For this purpose, the preplasticized polyvinyl chloride compound is injected at about 180°C into a boot mold. This mold consists of a last which is enveloped, at a distance of from a few millimeters to a few centimeters, by an outer wall. The polyvinyl chloride compound this fills only the narrow interstice between the last and the outer form. After the polyvinyl chloride has cooled, the mold is opened by removing the outer form and the boot is pulled from the last.

It is also in the prior art to make polyvinyl chloride boots by dipping a last into molten, plasticized polyvinyl chloride and then cool the coating which forms on the last. The cooled, solidified coating is then pulled off the last in the shape of a boot. (See plastics Dictionary A-Wittfoht, Vol. 2, page 456 and page 462).

These polyvinyl chloride boots are watertight but they are not too confortable to wear because they are heavy and have a poor hand, further they are clammy.

It is therefore an object of this invention to provide a novel boot construction which eliminates or significantly reduces the detrimental aspects of prior art molded plastic boots.

Other and additional objects of this invention will become apparent from a consideration of this entire specification including the drawing and claims hereof.

In accord with and fulfilling these objects, one aspect of this invention resides in a molded boot made of polyurethane. Such molded boot is of low specific weight, good hand and is surprisingly tough enough to withstand the rigors of normal everyday use. Polyurethane boots of low specific gravity, i.e., about 0.7 to 1.0 are made by forming a mixture of active hydrogen containing compound, polyisocyanate and water in proportions sufficient to react together to give a polyurethane foam of the above recited specific gravity. The polyurethane foam forming technology referred to herein is per se known in the polyurethane art, that is, it is known how to produce a polyurethane foam article of the required specific gravity. One formulation which exemplifies polyurethane foam forming compositions is as follows:

| MATERIAL | WEIGHT PERCENT |
|---|---|
| Active hydrogen compound (Desmophen 1468 polyester prepolymer parts by weight containing terminal hydroxyl groups made by polymerizing a dicarboxylic acid such as adipic acid and a glycal such as diethylene glycal — sold by Farbenfabriken, Bayer, Leverkusen, West Germany) | 92 |
| Butane diol-1,4 | 8 |
| Water | 0.3 |
| Catalyst (Dabco 33 LV — mixture of triethylene diamine and dipropyline glycal) | 0.7 |
| di-n-butyl tin dilaurate | 0.1 |
| Blowing agent (Frigen 11S — a halogenated hydrocarbon of the chloro fluoro ethylene type) Tolylene diisocyanate (Desmodur made by Farben Fabriken Bayer of Leverkusen, West Germany) | 40 |

This composition is mixed as per conventional polyurethane forming technology and this viscous mixture is poured into a mold which consists of a last and an outer wall. Foaming of this mixture then takes place in which the narrow interstice between the last and the outer form is filled with very light polyurethane foam. The mold must be sealed, but only so much of the mixture is put in that a relatively slight overpressure develops within the mold. Whereas in the injection molding of polyvinyl chloride boots an overpressure of up to 200 atmospheres is applied, the overpressure in the manufacture of foam polyurethane boots amounts to only about 1 to 5 atmospheres. Under these circumstances, a precisely shaped boot of very low specific weight is obtained. This is the main advantage of molded foam polyurethane boots over the heavier polyvinyl chloride boots of the prior art.

Figure 2:
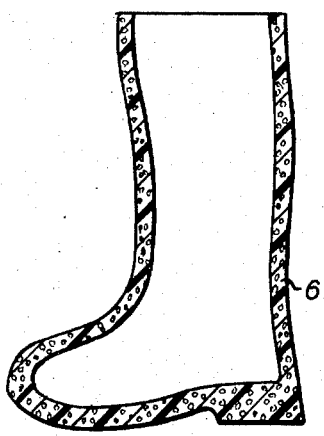
Figure 4:
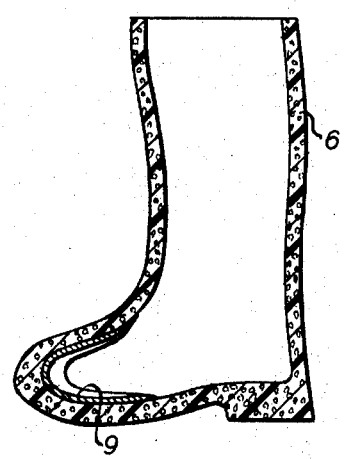
Figures 6, 9, 10:
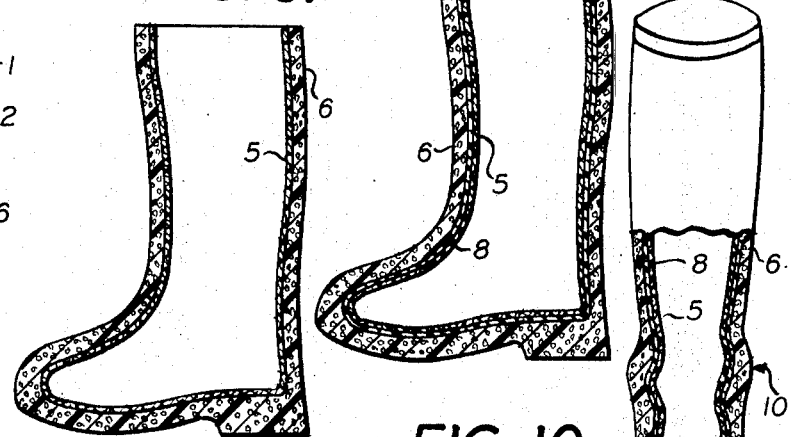

FIGS. 1, 3, 5 and 8 are side sectional elevations of a boot mold;

FIGS. 2, 4, 6. 7, 9 and 10 are side sectional elevations of foam molded boots.

Production of such a foam polyurethane boot is shown in FIG. 1 of the instant drawing which is a side sectional elevation of a boot molding means according to this invention. Referring to this figure of the drawing, a last 1 denotes the inside mold member which is surrounded by an external mold member 2 which together form a very thin mold cavity 3. The external mold member 2 is suitably bipartite in nature with a front half 2a and a rear half 2b. The polyurethane foam forming composition is fed into the mold cavity 3 through a passage 4. After the forming operation is completed, the external mold member 2 is removed and the boot is pulled from the last. The closure of the mold can preferably be achieved in the manner described in German Offenlegungsschrift No. 1,504,276.

Boots produced by the above described process are illustrated in FIG. 2 which is a foam molded boot shown inside sectioned elevation.

Figure 5:
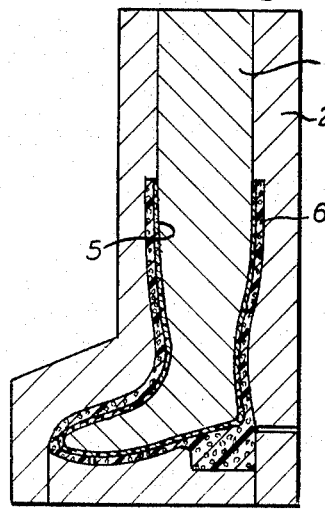

Although foam molded boots made in the manner described above are much superior to prior art produced molded polyvinyl chloride boots, in that they are lighter, sufficiently strong for their intended use, quite abrasion resistant and have a better hand, in order to improve the quality of such foam polyurethane boots as have been described above, it has been found to be desirable to provide a textile inner lining thereon. Referring to FIG. 5, which is a side elevation in section illustrating this aspect of this invention, the last 1 has a stocking or other woven, knit, or nonwoven fabric 5 disposed thereon. In all other aspects, the polyurethane molded boot is formed in the same way as described above. As the polyurethane foams to fill out the mold cavity between the last 1 and the external mold member 2, it adheres to the fabric 5 on the last so that when foaming is complete, the fabric 5 is integrally bonded to the inside of the boot 6 so produced. (See FIG. 6).

Figure 7:
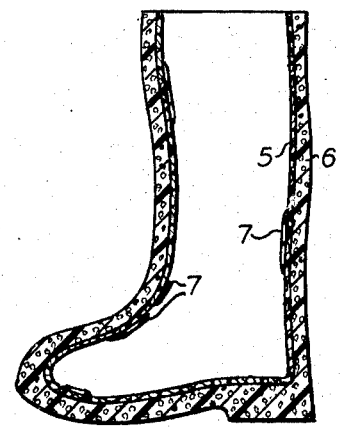

While this procedure produces an excellent product, in that the insulating properties and internal feel of the boot is significantly improved, it sometimes happens, because of the very small dimensions of the mold cavity used for making boots, that the polyurethane generates enough pressure during foaming to completely penetrate the fabric linings thus causing unsightly strike through spotting as shown in FIG. 7 at 7. Not only is the penetration of the polyurethane 6 through the fabric 5 unsightly, but it is technologically detrimental as well. In penetrating the fabric, the polyurethane loses its foam character and becomes solid. Therefore its density increases and its insulating properties decrease. Further, by filling up the meshes and interstices of the fabric lining, the insulating and hand properties of the lining are detrimentally altered.

It is therefore another aspect of this invention to provide a novel polyurethane foam molded boot of the type described above having an internal integral fabric lining which does not suffer from the disadvantages of polyurethane strike through.

Figure 8:
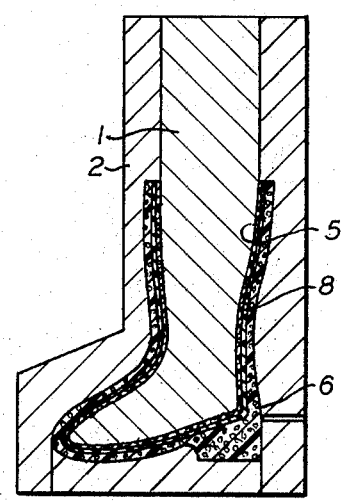

As shown in FIG. 8, which is a side elevation in section, a fabric 5 is first bonded to a thin layer of substantially impervious plastic, such as for example polyvinyl chloride, 8. This bonding can be performed by the so-called "counter-coat process" such as according to U.S. Pat. No. 2,813,052. First a thin layer of polyvinyl chloride is produced on a silicone paper, and textile material such as a woven, or knit fabric or flocking is laid onto the polyvinyl chloride while it is still plastic. This results in a firm bond between the textile and the polvinyl chloride layers. On account of the peculiar properties of the polymer, however (e.g., the polyvinyl chloride), the textile layer is never completely penetrated, so that the resultant laminate consists of two layers, the plastic layer and the textile layer, which are firmly bonded together but are otherwise distinct.

Laminated plastic-textile fabric products are generally commercially available from many sources. Any of these are suited for use in this aspect of this invention. Such laminate is suitably formed into a stocking and fit over the last. Such stocking can be made by cutting two matching halves from the laminate; these halves can then be simply welded together, since at least one layer is thermoplastic. Sewing is thus eliminated. Alternatively such stocking can be made in traditional round knitting fashion. This stocking is then drawn over the last so that the fabric is against the last. The mold is closed and then the polyurethane foaming is performed in the mold cavity as aforesaid to produce a line boot as shown in FIG. 9.

In this figure, the textile layer is numbered 5 and the plastic layer bonded thereto is numbered 8. When the foaming takes place, the polyurethane foam 6 reaches the plastic layer and bonds itself firmly to this layer without, of course, being able to penetrate it. The fabric layer 5 also adheres firmly to the plastic layer 8 resulting in a molded product where the polyurethane foam 6 is firmly bonded to plastic layer 8 and, through the plastic film layer, to a fabric layer 5. The thus produced boot is then pulled off the last 1 after the external mold member 2 is opened and removed.

In forming foam molded boots according to this invention, the foaming polyurethane displaces air from the mold cavity and then either strongly abuts the plastic film portion of the above-referred to textile fabric laminate or at least partially penetrates the fabric itself where no plastic film is used. Therefore the foaming takes place under a slight over pressure which tends to keep the foam pores small.

While a boot made in this manner from this flexible polyurethane foam mixture is very light, its solidity and stability are not such that it meets the safety boot requirements according to DIN 4843.

Figure 3:
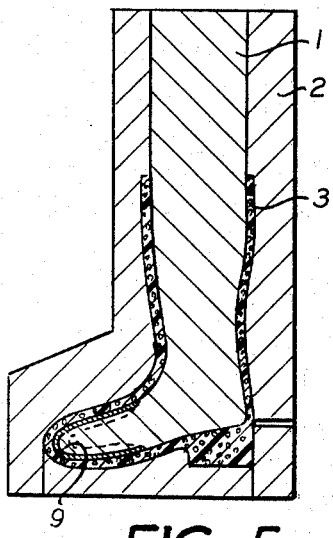

Therefore, according to a further aspect of this invention, illustrated in FIG. 3 which is a side sectioned elevation, before feeding the polyurethane paste into the mold, a metal or reinforced rigid plastic plate 9 is positioned over the front section 1a of the last 1. Thereupon the mold is assembled by closing external mold member 2. Some polyurethane paste is injected into the mold cavity 3 between last 1 and external mold member 2. The resulting foam 4 then fills the entire mold cavity and also encloses the metal plate 9. After opening up the mold as aforesaid, the finished polyurethane reinforced with a metal toe plate is pulled off the last.

Thus, the boot according to the invention is made of one piece. It is not necessary to sew or glue on the sole or any other part in a separate operation as is otherwise customary in the shoe industry. As a result of the special type of manufacture all parts are produced and assembled in one single operation. This does not only render manufacture cheaper, but also serves to increase the stability and durability of the boot so produced. It is advisable to provide the sole itself with a rhomboid-like pattern during manufacture in order to increase the frictional capacity thereof and reduce the danger of the wearer slipping. The sole design should not extend to the edge of the sole.

It is also possible in the same manner to provide reinforcing means in the sole of the boot by means of a metal or rigid plastic plate.

In the above described aspect of this invention where one or more reinforcing plates are provided over the toe, in the sole or in other parts of the boots hereof, it is preferred to utilize reinforced plastic shaped articles as the reinforcing insert plate means.

Glass-fiber reinforced plastics, e.g., glass-fiber reinforced epoxy resin, is preferably used as reinforcing material. But other hard plastics such as polyamides, polyester and duromer plates are also suitable with and without glass-fiber reinforcement. These plastics are given the desired shape in a separate operation. When reinforcing the toe sections these plastics then have the shape of the known steel caps. However, they may also be extended so as to protect the middle foot and the instep section.

Forming of the reinforcing plate means is accomplished consistent with the physical properties of the particular material selected. It may be accomplished by casting, injection molding or compression molding. These pre-shaped, stability-providing plastic caps are then built into the polyurethane foam boots of a desired specific weight.

It is advantageous to also place a plastic sole within a sole side of the boot — to protect against the penetration of nails — so that same is foamed in as well. The protective parts for the shoe uppers and the sole may also be produced as a continuous part.

Compared to steel parts, the protective parts of plastics material have the advantage of not requiring any special corrosion protection.

As another object of the invention, the leg portion of the boot is designed in such a way that the ankles protruding at the side of the foot have sufficient free space in the boot leg. See FIG. 10.

All known boots are designed in such a way that the ankles press against the leg walls thereof whereby a certain pressure is exerted upon them.

In the safety boots according to this invention, the leg walls in the vicinity of the ankles are provided with heavy wall thickness for protective padding of the foot against this pressure which may become unreasonably great. By curving the leg portion of the boot outward as shown in FIG. 10, a 10 in the region of the ankles on both sides of the foot, this pressure is eliminated according to the invention and the ankles are padded by a thicker polyurethane foam layer.

A further illustration of a polyurethane foam forming composition useful in this invention is as follows:

| COMPONENT | PARTS by WEIGHT |
|---|---|
| Active hydrogen containing compound (Desmophen 3900 — a polyol of a molecular weight of about 4800, an hydroxyl number of 35, an acid number of 0.1 containing trimethylol alkane and alkylene oxide mer units-marketed by Farben Fabriken Bayer of Leverkusen, West Germany) | 90 |
| Low molecular weight apolyalkylene oxide Diol 14B polyol sold by Badishe Analin und Soa Fabric of Ludwigshaven, West Germany) | 10 |
| Water | 1 |
| N,N dimethyl piperazine catalyst | 0.2 |
| Triethylenediamine catalyst | 1 |
| Tolylene diisocyanate | 40 |

What is claimed is:

1. A boot whose exterior surface consists essentially of foam polyurethane having a specific gravity of 0.7 to 1.0, a textile fabric adhered to the inner surface thereof, and a substantially impervious plastic film disposed between said fabric and said polyurethane foam.

2. A boot as claimed in claim 1 wherein said plastic film is polyvinyl chloride.

3. A boot as claimed in claim 1 having a substantially rigid reinforcing plate means integral with said polyurethane foam at predetermined locations therein.

4. A boot as claimed in claim 3 wherein said reinforcing plate means is steel.

5. A boot as claimed in claim 3 wherein said reinforcing plate means is substantially rigid plastic.

6. A boot as claimed in claim 5 wherein said plastic has fiber reinforcement therein.

7. A boot as claimed in claim 3 wherein said rigid reinforcing plate covers the toe portion of said boot and said rigid reinfrocing plate is metal.

* * * * *

UNITED STATES PATENT OFFICE
CERTIFICATE OF CORRECTION

Patent No. 3,823,493     Dated July 16, 1974

Inventor(s) Michael Brehm and Peter Rutsch

It is certified that error appears in the above-identified patent and that said Letters Patent are hereby corrected as shown below:

Before Related U.S. Application Data insert

-- Priority claimed on German Application Serial No. P 1 811 913.6 --

Column 1, line 14 change "this" to "thus"

Column 1, table, line 63 change "dipropyline cyclol" to "dipropylene glycol"

Column 3, line 17

After "chloride" delete the comma

Column 3, line 43 change "line" to "lined"

Column 5, in the table, line 18

After "oxide" and before "Diol" insert -- ( --

Signed and sealed this 14th day of January 1975.

(SEAL)
Attest:

McCOY M. GIBSON JR.
Attesting Officer

C. MARSHALL DANN
Commissioner of Patents